(No Model.)
S. H. BECK.
DETACHABLE SEAT FOR VELOCIPEDES.
No. 464,448. Patented Dec. 1, 1891.
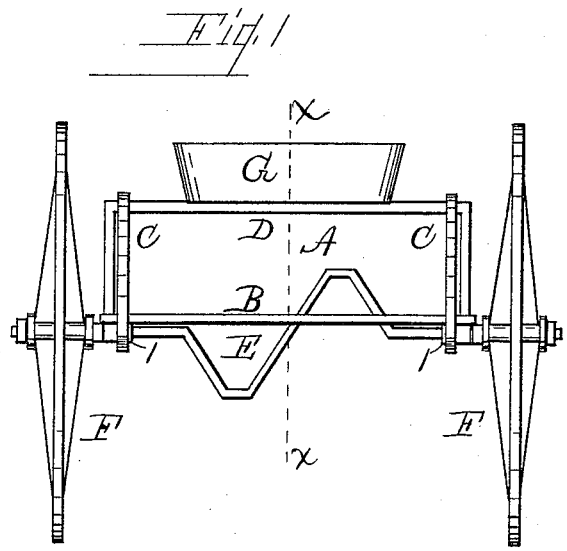
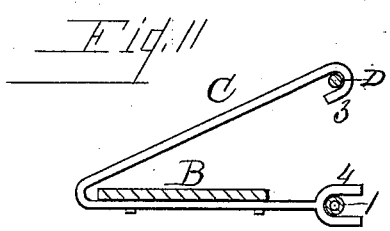
Witnesses
Inventor
Samuel H. Beck
By His Attorney B. Pickering

UNITED STATES PATENT OFFICE.

SAMUEL H. BECK, OF FINDLAY, ASSIGNOR OF ONE-HALF TO ANTHONY A. LISMAN, OF DAYTON, OHIO.

DETACHABLE SEAT FOR VELOCIPEDES.

SPECIFICATION forming part of Letters Patent No. 464,448, dated December 1, 1891.

Application filed July 15, 1891. Serial No. 399,549. (No model.)

*To all whom it may concern:*

Be it known that I, SAMUEL H. BECK, a citizen of the United States, residing at Findlay, in the county of Hancock and State of Ohio, have invented certain new and useful Improvements in Seats for Velocipedes; and I do hereby declare that the following is a full, clear, and exact description of the invention, which will enable others skilled in the art to which it appertains to make and use the same, reference being had to the accompanying drawings, and to the letters and numerals of reference marked thereon, which form a part of this specification.

My invention relates to improvements in a seat for velocipedes, used for attachment to vehicles, the features of which will be fully hereinafter described and claimed.

The object of my invention is to attach a platform to the rear of a tricycle or other vehicle, which will serve either as a seat for a person or to hold a parcel.

I accomplish the object by the device illustrated in the accompanying drawings, in which—

Figure I is a view of the rear portion of a tricycle with the device attached. Fig. II is a transverse section of the device on line $x$, Fig. I, showing only the bearing-points of the tricycle.

Like letters and numerals designate like parts in the two views.

A is the rear portion of an ordinary tricycle, comprising the frame D, to which the seat G is attached, the bent axle E, and the rear wheels F F.

C is a bar of iron, bent near its center, the upper end terminating in the hook 3 and the lower end terminating in the fork 4. At the outer ends, near the curves, is bolted the board B, which holds the two arms rigidly. The hooks 3 of the two arms engage the horizontal portion of the frame D, and the forks 4 engage a hollow projection 1 of said frame in which the axle rotates, and in this manner the seat or platform is held to the tricycle; or the same may be attached to the spring-bar and axle of a carriage. The use is to carry persons or parcels.

Having fully described my invention, what I claim, and desire to secure by Letters Patent, is—

The detachable seat comprising the supporting-arms C C, bent near their centers and having their upper ends bent in the form of a hook and the lower ends forked for attachment with horizontal parts of a vehicle, and the board B, attached to the lower legs of said supporting-arms, substantially as set forth.

In testimony that I claim the foregoing as my own I affix my signature in presence of two witnesses.

SAMUEL H. BECK.

Witnesses:
D. L. GRABLE,
H. ADIN GREEN.